United States Patent
Moretti et al.

(10) Patent No.: US 8,744,658 B1
(45) Date of Patent: Jun. 3, 2014

(54) OUTSIDE AIR TEMPERATURE CORRECTION FOR A VEHICLE

(71) Applicant: GM Global Technology Operations LLC, Detroit, MI (US)

(72) Inventors: Brunno L. Moretti, Walled Lake, MI (US); Kyle Holihan, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/740,703

(22) Filed: Jan. 14, 2013

(51) Int. Cl.
  *B60L 11/00* (2006.01)

(52) U.S. Cl.
  USPC ..... 701/22; 903/930; 180/65.265; 180/65.28; 180/65.29

(58) Field of Classification Search
  USPC .......... 701/22; 903/902, 903, 930; 180/65.21, 180/65.265, 65.275, 65.28, 65.29
  See application file for complete search history.

(56) References Cited

U.S. PATENT DOCUMENTS

| | | | | |
|---|---|---|---|---|
| 6,750,630 | B2 * | 6/2004 | Inoue et al. | 320/104 |
| 6,761,037 | B2 * | 7/2004 | Tsuboi et al. | 62/244 |
| 6,802,187 | B2 * | 10/2004 | Kawahara | 62/228.1 |
| 7,019,472 | B2 * | 3/2006 | Kayukawa et al. | 318/139 |
| 7,143,724 | B2 * | 12/2006 | Hashizumi et al. | 123/41.56 |
| 7,281,909 | B2 * | 10/2007 | Uno et al. | 417/374 |
| 2002/0084769 | A1 * | 7/2002 | Iritani et al. | 320/104 |
| 2003/0080714 | A1 * | 5/2003 | Inoue et al. | 320/150 |
| 2003/0136138 | A1 * | 7/2003 | Tsuboi et al. | 62/228.1 |
| 2006/0080986 | A1 * | 4/2006 | Inoue | 62/259.2 |
| 2008/0202137 | A1 * | 8/2008 | Inoue | 62/186 |
| 2010/0326127 | A1 * | 12/2010 | Oomura et al. | 62/498 |
| 2012/0130577 | A1 * | 5/2012 | Ichimoto | 701/22 |
| 2012/0290161 | A1 * | 11/2012 | Takeda et al. | 701/22 |

OTHER PUBLICATIONS

Liu, Wei, et al., Method and System for Determining a State of Charge of a Battery, U.S. Appl. No. 12/238,204, filed Sep. 25, 2008.
Liu, Wei, et al., Method and System for Determining a State of Charge of a Battery Based on a Transient Response, U.S. Appl. No. 12/238,224, filed Sep. 25, 2008.
Koch, Brian J., et al., Method and System for Determining a State of Charge of a Battery, U.S. Appl. No. 11/947,466, filed Nov. 29, 2007.
USPTO Application as filed U.S. Appl. No. 13/335,754, filed Dec. 22, 2011.

* cited by examiner

*Primary Examiner* — Russell Frejd
(74) *Attorney, Agent, or Firm* — Ingrassia Fisher & Lorenz, P.C.

(57) ABSTRACT

Methods, control systems, and vehicle are provided for controlling a vehicle that has a rechargeable energy storage system (RESS). A method includes storing with a control module a chosen outside air temperature (OAT) that is based on data from an OAT sensor and a cooling cycle of the RESS, and controlling the vehicle with the chosen OAT when a cooling cycle of the RESS is indicated. The control system and vehicle include control modules configured to perform the method.

20 Claims, 4 Drawing Sheets

OUTSIDE AIR TEMPERATURE CORRECTION FOR A VEHICLE

TECHNICAL FIELD

The technical field generally relates to electric vehicles, and more particularly relates to use of outside air temperature data in electric vehicles.

BACKGROUND

Certain vehicles, particularly electric vehicles and hybrid electric vehicles, have rechargeable energy storage systems (RESS), such as batteries. It is generally desired to maintain a temperature of the RESS within certain limits. The RESS temperature may be maintained by continuously monitoring the voltage and current values associated with the RESS, and by thermally conditioning the RESS when the RESS temperature approaches an upper or lower RESS temperature limit. A typical RESS conditioning cycle may expel heat in the area of an outside air temperature sensor, which may result in inaccurate outside air temperature measurements.

Accordingly, it is desirable to provide improved methods of controlling a vehicle that uses outside air temperature measurements. In addition, it is desirable to provide an improved apparatus for such control of the vehicle. Furthermore, other desirable features and characteristics of the present invention will become apparent from the subsequent detailed description and the appended claims, taken in conjunction with the accompanying drawings and the foregoing technical field and background.

SUMMARY

A method is provided for controlling a vehicle that has a rechargeable energy storage system (RESS). In one embodiment, the method includes storing with a control module a chosen outside air temperature (OAT) that is based on data from an OAT sensor and a cooling cycle of the RESS, and controlling the vehicle with the chosen OAT when a cooling cycle of the RESS is indicated.

A control system is provided for controlling a vehicle that has a rechargeable energy storage system (RESS). In one embodiment, the control system includes an outside air temperature (OAT) sensor and a control module. The control module has control logic configured to store a chosen outside air temperature (OAT) that is based on data from an OAT sensor and a cooling cycle of the RESS and control the vehicle with the chosen OAT when a cooling cycle of the RESS is indicated.

A vehicle is provided. In one embodiment, the vehicle includes an outside air temperature (OAT) sensor, a rechargeable energy storage system (RESS), and a control module. The control module has control logic configured to store a chosen outside air temperature (OAT) that is based on data from an OAT sensor and a cooling cycle of the RESS. The control logic is further configured to control the vehicle with the chosen OAT when a cooling cycle of the RESS is indicated.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
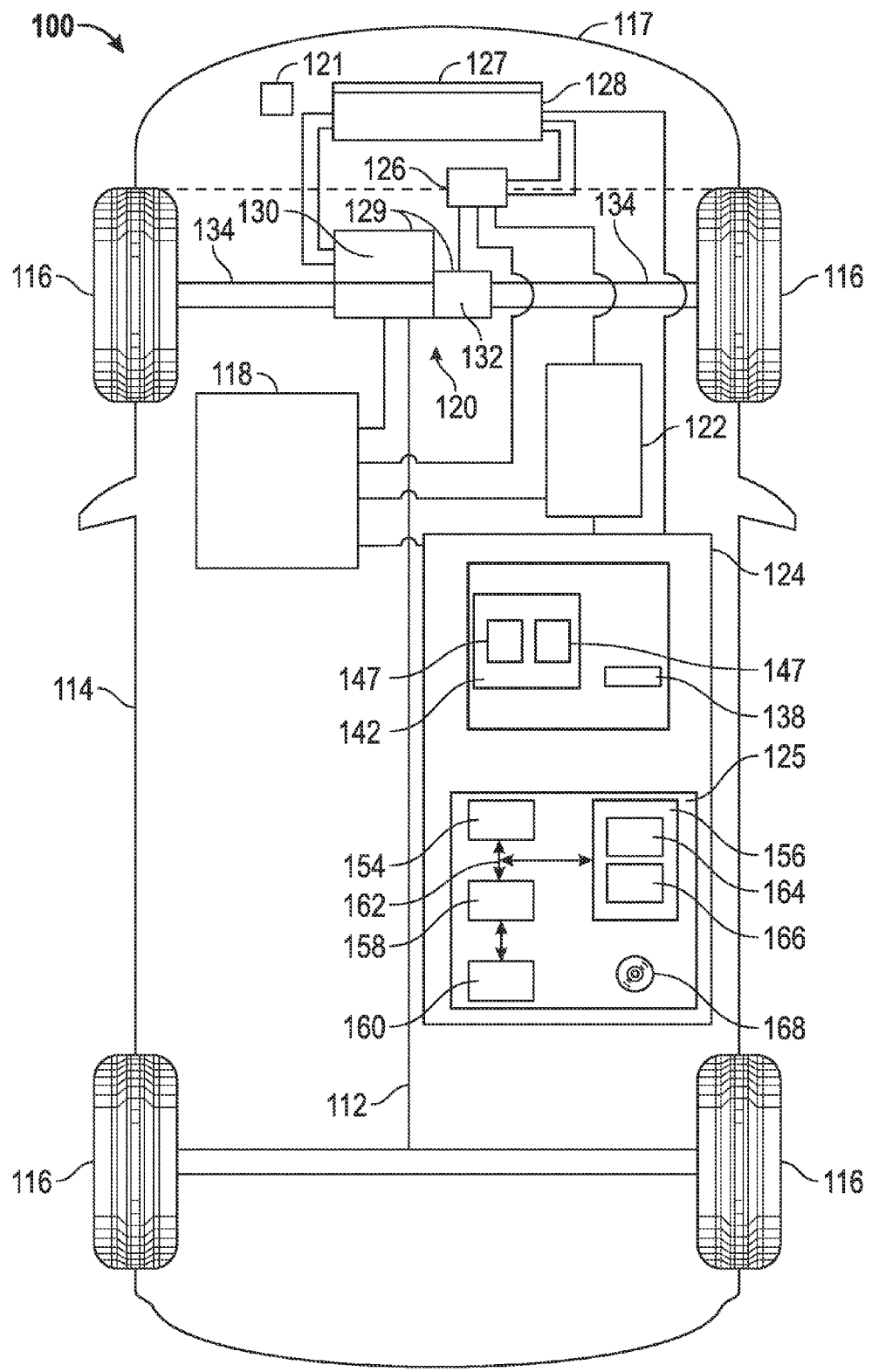
FIG. 1 is a simplified block diagram of a vehicle including a control module in accordance with an embodiment.

FIG. 1 illustrates a vehicle 100, or automobile, according to an exemplary embodiment. As described in greater detail below, the vehicle 100 is configured to thermally condition a rechargeable energy storage system (RESS) of the vehicle 100.

The vehicle 100 includes a chassis 112, a body 114, four wheels 116, and an electronic control system 118. The body 114 is arranged on the chassis 112 and substantially encloses the other components of the vehicle 100. The body 114 and the chassis 112 may jointly form a frame and may define a front portion 117. The front portion 117 may include bumpers, front end panels, grilles, headlights, and other components without departing from the scope of the present disclosure. In the example provided, the front portion 117 is a front fascia. The wheels 116 are each rotationally coupled to the chassis 112 near a respective corner of the body 114.

In the exemplary embodiment illustrated in FIG. 1, the vehicle 100 is a hybrid electric vehicle (HEV), and further includes an actuator assembly 120, an outside air temperature (OAT) sensor 121, a RESS 122, a RESS control system 124, a control module 125, a power inverter assembly (or inverter) 126, a RESS condenser 127, and a radiator 128. The actuator assembly 120 includes at least one propulsion system 129, a combustion engine 130, and an electric motor/generator (or motor) 132. The propulsion system 129 is mounted on the chassis 112 and drives the wheels 116. As will be appreciated by one skilled in the art, the electric motor 132 includes a transmission therein, and, although not illustrated, also includes a stator assembly (including conductive coils), a rotor assembly (including a ferromagnetic core), and a cooling fluid or coolant. The stator assembly and/or the rotor assembly within the electric motor 132 may include multiple electromagnetic poles, as is commonly understood. In some embodiments, the vehicle 100 is a pure electric vehicle, and the combustion engine 130 is omitted.

Still referring to FIG. 1, the combustion engine 130 and the electric motor 132 are integrated such that one or both are mechanically coupled to at least some of the wheels 116 through one or more drive shafts 134. In one embodiment, the vehicle 100 is a "series HEV," in which the combustion engine 130 is not directly coupled to the transmission, but coupled to a generator (not shown), which is used to power the electric motor 132. In another embodiment, the vehicle 100 is a "parallel HEV," in which the combustion engine 130 is directly coupled to the transmission by, for example, having the rotor of the electric motor 132 rotationally coupled to the drive shaft of the combustion engine 130. In certain other embodiments, the vehicle 100 may comprise a pure electric vehicle, without a combustion engine 130.

The OAT sensor 121 presents data to systems of the vehicle to indicate the temperature of the outside air. In the embodiment provided, the OAT sensor 121 is disposed in the front portion 117 of the vehicle 100. Vehicle systems of the engine 110 and/or transmission system 111 may operate based on OAT signals from the OAT sensor 121. In the example provided, the OAT signals are used for determining when to "wake up" the vehicle when the vehicle is in an "off power" or "charge" mode, where the vehicle is not in a "drive" mode. The vehicle 100 is in the off power mode when the vehicle is not charging and an ignition key or other driver authentication device indicates that the systems of the vehicle are not in use, such as when the vehicle 100 is stored in a parking lot during a workday. The vehicle 100 is in the charge mode when the vehicle 100 is coupled for electric charging with a power source, such as a charging station in a garage. The vehicle 100 is in the drive mode when the ignition key or other driver authentication device indicates that the vehicle is to be driven. The vehicle wakes up by providing power to control modules to perform various tasks. For example, the vehicle may wake up at different intervals based on the OAT signals to determine when to initiate thermal conditioning of the RESS 122 when the vehicle is in an off power mode.

Additional systems that depend on the OAT sensor 121 may include control systems and/or diagnostic systems. Example OAT dependent vehicle systems are: an evaporative emissions control (EVAP) system; an engine coolant temperature rationality (ECTR) system; a high-sided coolant rationality (HSCR) system; a heating, ventilating and air conditioning (HVAC) system; an emissions or start of injection (SOI) system; an auxiliary pump control system; a hybrid vehicle system; a positive crankcase ventilation (PCV) system; etc. OAT information may be provided to powertrain, body, and chassis control modules where OAT information may be used for preconditioning, vehicle starting, engine cycling conditions, etc. The OAT information may be used to determine fuel quantities, for EGR control, for boost control, for estimating soot loading, etc.

The RESS 122 is electrically connected to the inverter 126. In one embodiment, the RESS 122 is mounted on the chassis 112. In one such embodiment, the RESS 122 is disposed within a cockpit of the vehicle. In another embodiment, the RESS 122 is disposed underneath a cockpit of the vehicle. The RESS 122 may include a rechargeable battery having a pack of battery cells. In one embodiment, the RESS 122 includes a lithium iron phosphate battery, such as a nanophosphate lithium ion battery. Together the RESS 122 and the propulsion system 129 provide a drive system to propel the vehicle 100. The RESS 122 is thermally conditioned by the RESS control system 124, as described in detail below.

As depicted in FIG. 1, the RESS control system 124 includes a thermal conditioning system 138 and a sensor array 142. The RESS control system 124 is coupled to, and at least facilitates control over, the RESS 122. In addition, although not illustrated as such, the RESS control system 124 (and/or one or more components thereof) may be integral with the electronic control system 118 and may also include one or more power sources.

The sensor array 142 includes one or more RESS sensors 147 that provide signals and/or information pertaining to the measurements for processing and for use in thermally conditioning the RESS 122.

The thermal conditioning system 138 includes a compressor that is coupled with the RESS condenser 127 for cooling the RESS 122. In the example provided, the RESS condenser 127 is disposed in the front portion 117 of the vehicle 100 proximate to the OAT sensor 121.

As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality. In the example provided, the control module 125 executes the tasks of the processes described herein, such as the tasks of the processes 400 and 500 described below in connection with FIGS. 3-4.

The memory 156 can be any type of suitable memory. This would include the various types of dynamic random access memory (DRAM) such as SDRAM, the various types of static RAM (SRAM), and the various types of non-volatile memory (PROM, EPROM, and flash). The bus 162 serves to transmit programs, data, status and other information or signals between the various components of the control module 125. In some embodiments, the memory 156 stores the above-referenced program 164 along with one or more stored values 166 of the OAT sensor 121 for use during reconditioning of the RESS 122. In certain examples, the memory 156 is located on and/or co-located with the same computer chip as the processor 154.

The interface 158 allows communication with the control module 125, for example from a system driver and/or another computer system, and can be implemented using any suitable method and apparatus. The interface 158 may include one or more network interfaces to communicate with other systems or components. The interface 158 may also include one or more network interfaces to communicate with technicians, and/or one or more storage interfaces to connect to storage apparatuses, such as the storage device 160.

The storage device 160 may be any suitable type of storage apparatus, including direct access storage devices such as hard disk drives, flash systems, and optical disk drives. In one exemplary embodiment, the storage device 160 comprises a program product from which memory 156 can receive a program 164 that executes one or more embodiments of one or more processes of the present disclosure, such as the steps of the processes 400 and 500 of FIGS. 3-4, described further below. In another exemplary embodiment, the program product may be directly stored in and/or otherwise accessed by the memory 156 and/or a disk (e.g., disk 168), such as that referenced below.

The bus 162 may be any suitable physical or logical means of connecting computer systems and components. This includes, but is not limited to, direct hard-wired connections, fiber optics, infrared and wireless bus technologies. During operation, the program 164 is stored in the memory 156 and executed by the processor 154.

The thermal conditioning system 138 thermally conditions the RESS 122. Specifically, the thermal conditioning system 138 utilizes heating and cooling techniques, as appropriate, for heating or cooling the RESS 122. The heating and cooling techniques are selected so as to attain the desired heating or cooling of the RESS 122 while optimizing energy efficiency. For example, the thermal conditioning system 138 may include a compressor coupled with the RESS condenser 127 for cooling the RESS 122.

Figure 2:
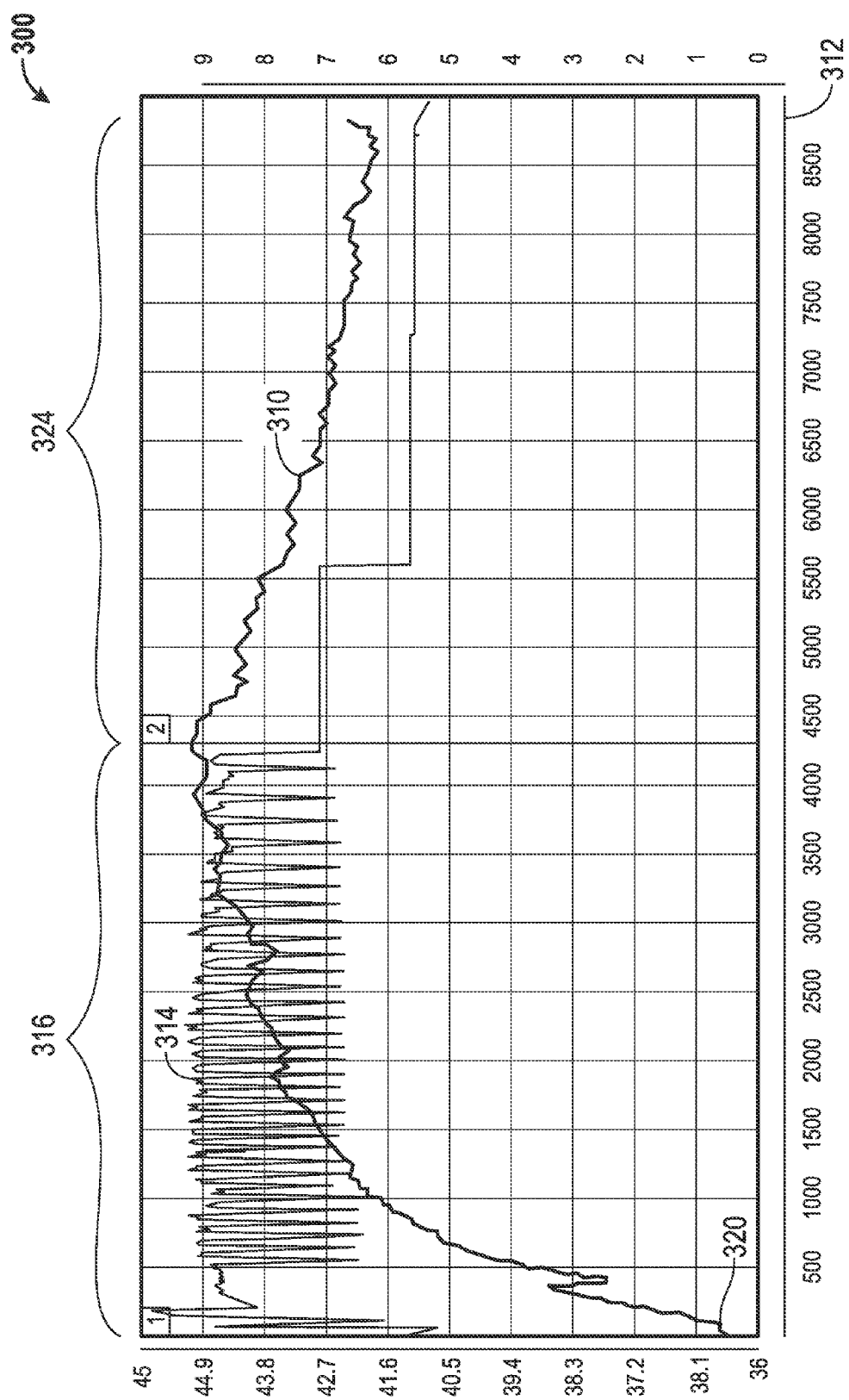
FIG. 2 is a graphical view of temperature with time in accordance with an embodiment.

Referring now to FIG. 2, a graph 300 illustrates a temperature 310 as measured by the OAT sensor 121 as a function of time 312 in a battery electric vehicle. The graph 300 illustrates an example of timing associated with the operations of FIG. 3 and FIG. 4. The time 312 is measured after initiation of a cooling cycle of the RESS 122 when the vehicle 100 is in an off-power or a charging mode. A pressure 314 of the refrigerant within the thermal conditioning system 138 indicates an active cooling cycle 316 during which a refrigerant compressor of the thermal conditioning system 138 is active. An initial temperature 320 is substantially equal to the actual OAT. In some embodiments, a chosen OAT is captured at the initial temperature 320 for use by the operation of FIG. 4, as will be described below.

Throughout the active cooling cycle 316 the condenser of the thermal conditioning system 138 is expelling heat into the front portion 117 of the vehicle. When the vehicle 100 is in the driving mode, the expelled heat is generally carried away by air moving through the front portion 117 as the vehicle is in motion. When the vehicle is in the off-power or the charge mode, as in FIG. 2, the expelled heat remains in the front portion 117. Therefore, the measured temperature 310 at the OAT sensor 121 rises during the active cooling cycle 316. In the example provided in FIG. 2, the temperature 310 measured by the OAT sensor 121 rises by about 9.5 degrees Celsius during the cooling cycle 316. In some embodiments, the chosen OAT is used during the active cooling cycle, as will be described below.

A cooldown period 324 begins when the active cooling cycle 316 ends. The hot air in the front portion 117 gradually cools as heat is exchanged with the environment that surrounds the vehicle 100. Accordingly, as the cooldown period 324 proceeds, the measured temperature 310 decreases and approaches the actual OAT.

Figure 3:
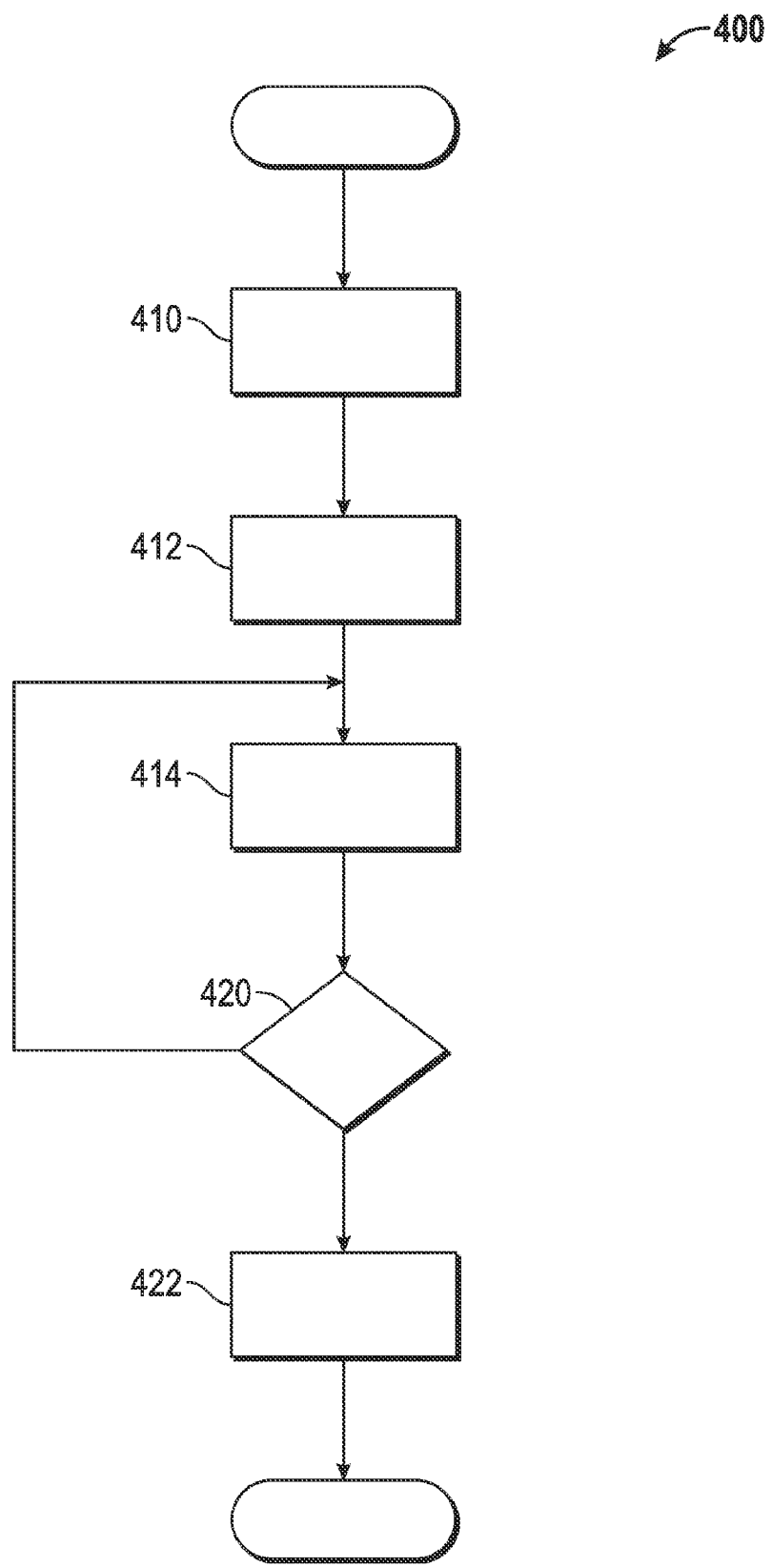
FIG. 3 is a flow diagram view of a method in accordance with an embodiment.
Figure 4:
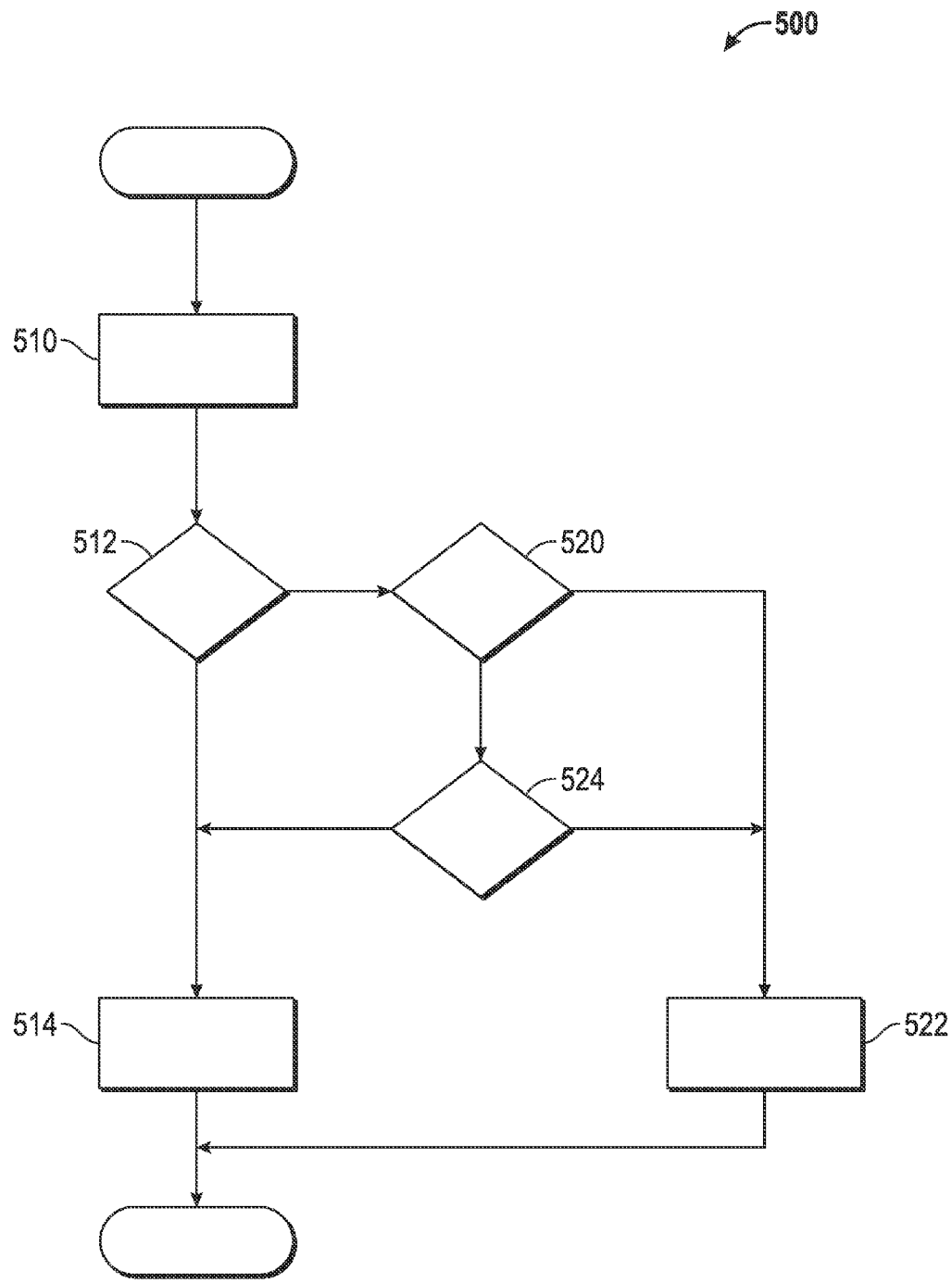
FIG. 4 is a flow diagram view of a method in accordance with an embodiment.

Referring now to FIG. 3, a flow diagram illustrates a method 400 for correcting an OAT sensor. While FIG. 2 and FIG. 3 illustrate a specific order of execution of operations, other possible orders of execution may be undertaken in other implementations. The other possible orders of execution may include, for example, concurrent execution of one or more operations.

In the example provided, the method 400 is performed by the control module 125 to obtain a chosen OAT from the OAT sensor 121. At block 410 a cooling request is received. For example, the RESS control system 124 may request that the thermal conditioning system 138 begin the active cooling cycle 316. In some embodiments, the control module 125 receives the cooling request at a rising edge of an electrical signal for a cooling request as the RESS control system 124 changes the status of the request from zero to one. For example, the RESS sensors 147 may indicate to the thermal conditioning system 138 that the temperature of the RESS 122 is above a selected threshold. Accordingly, the thermal conditioning system 138 may request that the compressor and the RESS condenser 127 actively cool the RESS 122.

At block 412 the data output of the OAT sensor 121 are captured and stored as a chosen OAT. In the example provided, the chosen OAT is selected at the start of an active cooling cycle to provide a recent and accurate temperature for controlling the vehicle 100. In some embodiments, block 412 is performed only when the vehicle 100 is in the charge mode or the off power mode. Active cooling of the RESS 122 proceeds at block 414. Block 420 determines whether the cooling cycle 316 has ended. When the cooling cycle 316 has not ended, the method 400 returns to block 414 to continue cooling the RESS 122.

When the cooling cycle 316 has ended, the method 400 proceeds to block 422 where a cooldown timer is started. In the example provided, the RESS control system 124 determines that the cooling cycle 316 has ended at the falling edge of the electrical signal for the cooling request when the RESS control system 124 changes the status of the request from one to zero. The length of the cooldown timer may be selected based on the characteristics of the particular vehicle 100 so that the cooldown timer expires when the temperature in the front portion 117 of the vehicle 100 is substantially equal to the OAT. For example, a different cooldown timer may be selected for different model vehicles that have different shapes and thermal properties at the front portion 117. In some embodiments, different cooldown timers may be selected for vehicles in the same model family that have different upgrades or options. For example, a vehicle that uses batteries in the RESS 122 may include an option for a larger battery pack for extended range of the vehicle 100. The larger battery pack may require expelling more heat into the front portion that a vehicle without the extended battery pack option, and therefore a longer cooldown timer may be selected based on the extended battery pack option.

Referring now to FIG. 7, a flow diagram illustrates a method 500 for controlling a vehicle. For example, the control module 125 may perform the method to determine when to wake up the vehicle to monitor systems of the vehicle 100, such as a temperature of the RESS 122. In some embodiments, the OAT may be used to set a time interval between wake up events of the vehicle 100. In some embodiments, the time interval is set based on the OAT to thermally condition the battery. For example, on a hot summer day the time interval may be shorter than on a mild day because the RESS 122 may need thermal conditioning more often on the hot summer day. In some embodiments, the chosen OAT may be used with active cooling threshold tables to determine the battery temperature at which the active cooling cycle will end.

At block 510 an OAT request is received. The request may be from any system of the vehicle for any use of the OAT. For example, the vehicle may wake up from a low power state to monitor various systems of the vehicle, such as a temperature of the RESS 122.

At block 512 it is determined whether the vehicle 100 is in a driving mode (e.g., not in a charging or off-power mode). When the vehicle 100 is in the driving mode, current data from the OAT sensor 121 are used to control the vehicle at block 514. In the example provided, the driving mode indicates that movement of the vehicle 100 may allow air to flow through the front portion 117 of the vehicle to carry away heat expelled from the RESS condenser 127. It should be appreciated that other criteria for determining whether data from the OAT sensor 121 are accurate may be incorporated without departing from the scope of the present disclosure.

When the vehicle 100 is in the charging or off-power mode, it is determined at block 520 whether the active cooling cycle 316 is in progress. When the active cooling cycle 316 is in progress, a chosen OAT is used to control the vehicle. For example, the chosen OAT stored at block 412 may be utilized. When the active cooling cycle 316 is not in progress, it is determined whether the cooldown timer is active at block 524. When the cooldown timer is not active, data from the OAT sensor 121 are used to control the vehicle 100 at block 514. When the cooldown timer is active, the chosen OAT is used to control the vehicle 100 at block 522. Accordingly, blocks 520 and 524 indicate the active cooling cycle to partially determine whether to use the chosen OAT to control the vehicle.

The embodiments provided herein have several beneficial characteristics. For example, by proactively looking at battery conditioning in order to determine when an artificial OAT rise will take place, remedial action may be taken by storing a chosen OAT. The chosen OAT may then be used while the OAT is artificially raised (e.g., during a cooling cycle of the RESS) and for a predetermined amount of time after active cooling is complete. Accordingly, OAT sensor proximity to a condenser may be accounted for when the vehicle performs an active battery cooling cycle during charging and when in off power mode. Accurate OAT may be used to reduce the number of vehicle wake ups and reduce energy use, among other uses.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method for controlling a vehicle that has a rechargeable energy storage system (RESS), the method comprising:
storing with a control module a chosen outside air temperature (OAT) that is based on data from an OAT sensor and a cooling cycle of the RESS; and
controlling the vehicle with the chosen OAT when a cooling cycle of the RESS is indicated.

2. The method of claim 1 wherein controlling the vehicle further includes controlling the vehicle with the chosen OAT when the vehicle is in one of a charging mode and an off-power mode.

3. The method of claim 2 wherein storing the chosen OAT further includes storing data from the outside air temperature (OAT) sensor as the chosen OAT when the cooling cycle of the RESS is not indicated.

4. The method of claim 3 wherein storing a chosen OAT further includes storing data from the outside air temperature (OAT) sensor as the chosen OAT when the active cooling cycle of the RESS is requested.

5. The method of claim 3 wherein storing a chosen OAT further includes storing data from the outside air temperature (OAT) sensor when an electrical signal indicating an active cooling request is detected.

6. The method of claim 1 further comprising starting a cooldown timer when the cooling cycle of the RESS ends, and wherein controlling a cooling cycle of the RESS is indicated includes controlling the vehicle based on the chosen OAT when one of the cooling cycle and the cooldown timer is active.

7. The method of claim 6 wherein controlling the vehicle further includes controlling the vehicle when the vehicle is in one of a charging mode and an off-power mode, the cooling cycle is inactive, and the cooldown timer is inactive.

8. A control system for controlling a vehicle that has a rechargeable energy storage system (RESS), the control system comprising:
an outside air temperature (OAT) sensor; and
a control module that:
stores a chosen outside air temperature (OAT) that is based on data from an OAT sensor and a cooling cycle of the RESS; and
controls the vehicle with the chosen OAT when a cooling cycle of the RESS is indicated.

9. The control system of claim 8 wherein the control logic controls the vehicle based on the chosen OAT when the vehicle is in one of a charging mode and an off-power mode.

10. The control system of claim 9 wherein the control logic stores data from the OAT sensor as the chosen OAT when the cooling cycle of the RESS is not indicated.

11. The control system of claim 10 wherein the control logic stores data from the outside air temperature (OAT) sensor as the chosen OAT when the active cooling cycle of the RESS is requested.

12. The control system of claim 8 wherein the control logic starts a cooldown timer when the cooling cycle of the RESS ends, and wherein the cooling cycle of the RESS is indicated when one of the cooling cycle and the cooldown timer is active.

13. The control system of claim 12 wherein the control logic stores data from the OAT sensor as the chosen OAT when the vehicle is in one of a charging mode and an off-power mode, the cooling cycle is inactive, and the cooldown timer is inactive.

14. The control system of claim 8 further including a heat exchanger disposed in proximity to the OAT sensor, wherein the heat exchanger is coupled for thermal communication with the RESS system.

15. A vehicle, comprising:
an outside air temperature (OAT) sensor;
a rechargeable energy storage system (RESS); and
a control module having control logic that:
stores a chosen outside air temperature (OAT) that is based on data from an OAT sensor and a cooling cycle of the RESS; and
controls the vehicle with the chosen OAT when a cooling cycle of the RESS is indicated.

16. The vehicle of claim 15 wherein the control logic controls the vehicle based on the chosen OAT when the vehicle is in one of a charging mode and an off-power mode.

17. The vehicle of claim 16 wherein the control logic stores data from the outside air temperature (OAT) sensor as the chosen OAT when the cooling cycle of the RESS is requested.

18. The vehicle of claim 15 wherein the control logic starts a cooldown timer when the cooling cycle of the RESS ends, and wherein the control logic controls the vehicle based on the chosen OAT when one of the cooling cycle and the cooldown timer is active.

19. The vehicle of claim 15 further comprising a heat exchanger disposed in proximity to the OAT sensor and coupled for thermal communication with the RESS system.

20. The vehicle of claim 19 further comprising a front fascia, and wherein the heat exchanger is a condenser disposed in the front fascia, and wherein the OAT sensor is disposed in the front fascia.

* * * * *